United States Patent [19]

Ikimi et al.

[11] Patent Number: 4,914,712
[45] Date of Patent: Apr. 3, 1990

[54] DEVICE FOR SUPPORTING LIFT ROLL FOR FORK LIFT TRUCK

[75] Inventors: Yoshihiro Ikimi; Masami Ochiai, both of Kariya, Japan

[73] Assignee: Kabushiki Kaisha Toyoda Jidoshokki Seisakusho, Kariya, Japan

[21] Appl. No.: 329,182

[22] Filed: Mar. 27, 1989

[30] Foreign Application Priority Data

Apr. 8, 1988 [JP] Japan .................................. 63-87939
Apr. 8, 1988 [JP] Japan .................................. 63-87940

[51] Int. Cl.4 ............................................ F16C 23/06
[52] U.S. Cl. .................................. 384/449; 384/513; 384/519
[58] Field of Search ............... 384/449, 519, 583, 513, 384/569, 517, 542

[56] References Cited

U.S. PATENT DOCUMENTS

| 2,161,210 | 6/1939 | Waalkes | 384/449 |
| 4,611,934 | 9/1986 | Piotrowski et al. | 384/519 |
| 4,784,438 | 11/1988 | Fikse | 384/583 |
| 4,798,149 | 1/1989 | Hoffmann | 384/449 |

Primary Examiner—Lenard A. Footland
Attorney, Agent, or Firm—Brooks Haidt Haffner & Delahunty

[57] ABSTRACT

This invention relates to a device for supporting a lift roll for a fork lift truck of the type in which the thrust in the fore and aft direction and in the transverse direction is supported solely by a lift roll, the contact pressure of the lateral side of the outer race with respect to the pressure-receiving section is adjusted by an adjustment screw.

8 Claims, 6 Drawing Sheets

FIG. I
PRIOR ART
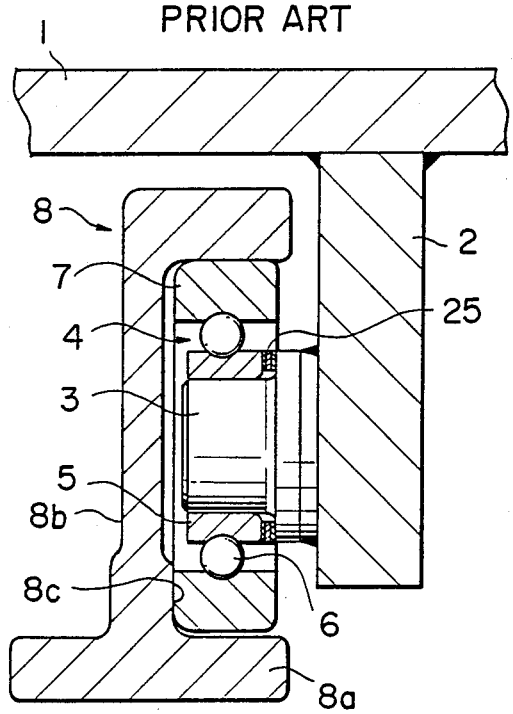
FIG. 2
PRIOR ART
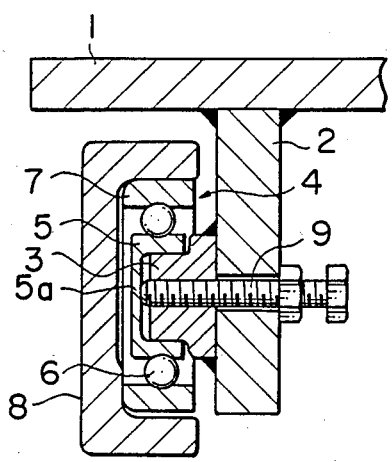

DEVICE FOR SUPPORTING LIFT ROLL FOR FORK LIFT TRUCK

BACKGROUND OF THE INVENTION

1. Field of the Invention

This invention relates to a device for supporting a lift roll for a fork lift truck of the type in which the thrust in the fore and aft direction and in the transverse direction is supported solely by a lift roll. More particularly, it relates to a device for supporting the lift roll of the type in which the thrust in the transverse direction is supported by that the lateral side of the outer race abuts on a pressure receiving section formed on a web of a mast and in which the contact pressure of the lateral side of the outer race with respect to the pressure-receiving section is adjusted by an adjustment screw.

2. Prior Art

FIG. 1 shows a typical prior-art lift roll 4 of the type in which a transverse thrust is received by abutment of the lateral surface of an outer race 7 on a pressure-receiving portion 8c formed on a web 8b of an inner mast 8. The lift roll 4 is mounted to a roll pin 3 projectingly mounted as by welding to a rear plate 2 of a lift bracket 1 as shown. That is, an inner race 5 is fitted on the roll pin 3 for movement axially, while an outer race 7 is fitted on the inner race 5 for rotation, this outer race 7 being adapted for rolling longitudinally on a flange section 8a as the lateral side of the outer race abuts on a pressure-receiving portion 8c formed on the web 8b of the inner mast 8. The contact pressure of the lateral side of the outer race on the pressure-receiving portion 8c is usually adjusted by a shim 25. The adjustment system of this type is shown for example in the Japanese Patent Publication No. 32819/1973.

Another adjustment system using a screw is shown in FIG. 2 in which the inner race 5 is fitted with a bottom plate 5a one lateral side of which is closed by a plate. The bottom plate 5a is thrusted towards the inner mast 8 by an adjustment screw 9 threadedly passed through central openings of the roll pin 3 and of the rear plate 2 of the lift bracket 1. This adjustment system is described for example in the Japanese Utility Model Publication No. 31674/1984.

In the above described conventional lift rolls, the inner race 5 can be extracted from the roll pin 3 in both the adjustment system by the shim 25 and the adjustment system by the adjustment screw 9. Thus, in case when flexure or distortion has occurred between the inner mast 8 and the lift bracket 1, there is the risk of the lift roll 4 dropping off the roll pin 3 or the lift roll 4 being tilted to cause locking. This phenomenon of flexure or distortion between the inner mast 8 and the lift bracket 1 is likely to occur in case of application of a partialized load, that is, when the load is clamped in the acutely partialized state such as in the course of the material handling operation employing a rotary clamp, and the load is then relocated after inverting the load through 90° or 180°. Since the left and right side inner masts 8 are arranged in the form of a letter eight narrowed at the ends in order to eliminate vibrations in the raised state, the lift roll 4 is liable to drop off the roll pin 3 when the lift bracket 1 is tilted relative to the inner masts 8, as shown in FIG. 4. There is also, as shown in FIG. 3, the risk that the lift roll 4 be moved in the dropping direction relative to the roll pin 3 while being tilted and locked between the inner masts 8 and the roll pin 3 such that rotation thereof is inhibited.

It is therefore an object of the present invention to provide a device for supporting a lift roll for a fork lift track that is free from the above described disadvantages of the prior art device.

SUMMARY OF THE INVENTION

According to the present invention, there is provided a device for supporting a lift roll for a fork lift, comprising an annular inner race slidably fitted on a roll in secured to a rear plate of a lift member, and an outer race rotatably fitted to said inner race, said outer race being adapted to roll along a flange section of an inner mast, with the lateral side of said outer race abutting on a web of said inner mast, wherein the improvement resides in that it further comprises a protruding portion formed towards said inner mast of said inner race and protruding a predetermined length from an end of said roll pin, an adjustment screw passed through and threaded engaged with said rear plate and roll pin, and retaining means for engaging said adjustment screw with said protruding portion and for causing said inner race and said adjustment screw to be moved in unison, the contact pressure of said outer race at said pressure-receiving section being adjusted by rotation of said adjustment screw.

In the above arrangement, the contact pressure of the lateral sides of the outer race relative to the pressure-receiving section of the inner masts may be adjusted by screwing an adjustment screw to thrust the inner race outwards via the piston ring. After termination of such adjustment, since the inner race and the adjustment screw are engaged at all times with each other by the retaining means, the lift roll may be maintained at the adjustment position, so that the lift roll and the roll pin may be maintained at all times in the interengaged portion.

According to the present invention, the contact pressure between the pressure-receiving section of the mast and the outer lateral side of the outer race may be adjusted by an adjustment screw, resulting in shortened adjustment time. Re-adjustment during application may be made without dismantling the lift bracket. Above all, dropping of the lift roll or the tilt of the lift roll relative to the roll pin or the mast incurring locking during the application of a partialized load in the course of the material handling operation may be avoided to maintain the smooth guide function by the lift roll.

BRIEF DESCRIPTION OF THE DRAWINGS

FIGS. 1 to 4 illustrate a conventional lift roll supporting device, wherein FIG. 1 is a sectional plan view showing a first prior-art example;

FIG. 2 is a sectional plan view showing a second prior-art example;

FIG. 3 is a sectional plan view showing the deflective state, and FIG. 4 is a plan view showing the deflective state;

FIGS. 5 to 10 illustrate preferred embodiments of a lift roll supporting device for a fork lift according to the present invention, wherein FIG. 5 is a sectional plan view showing a first embodiment;

FIG. 6 is an enlarged sectional plan view showing essential parts shown in FIG. 5;

FIG. 7 is a side elevational view of a lift roll mounted to a lift bracket;

FIG. 8 is a sectional plan view showing a second embodiment;

Figure 8:
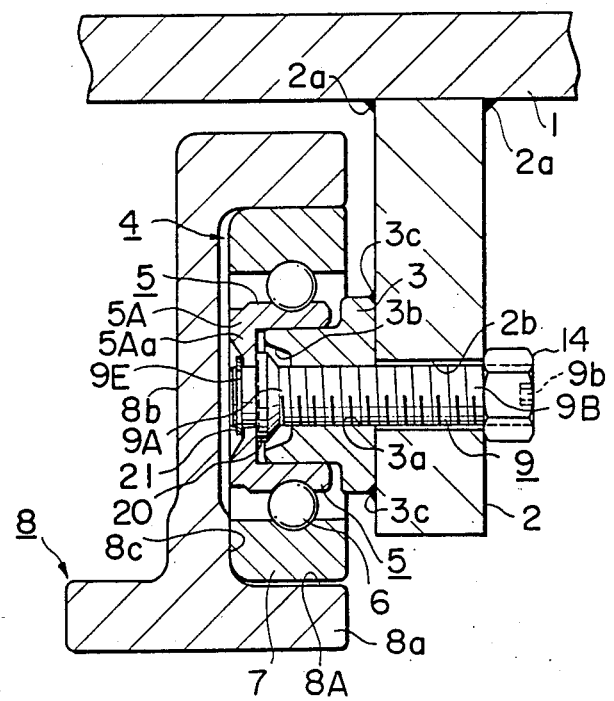

pig. 9 is an enlarged sectional view showing essential parts of FIG. 8; and

Figure 10:
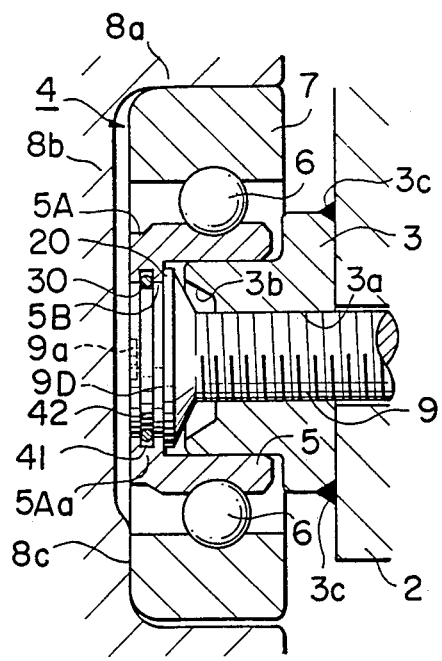

FIG. 10 is an enlarged sectional plan view showing essential parts of a third embodiment.

EMBODIMENT

Referring to FIGS. 5 to 10, certain illustrative embodiments of the present invention will be described in detail. In the first embodiment shown in FIGS. 5 and 6, 1 denotes a lift bracket as a lift member. Roll pins 3 are secured by welds 3c to the upper and lower outer lateral sides of a rear plate 2 provided via welds 2a to this lift bracket 1. Each roll pin 3 has a central screw hole 3a. A lift roll 4 is constituted by an annular inner race 5 fitting the roll pin 3 and an annular outer race 7 fitted for rotation on the outer periphery of the inner race 5. The inner race 5 thus fitted has a boss 5A protruding axially a predetermined length from the foremost part 3d of the roll pin 3. On the other hand, the outer race 7 is fitted in a recess 8A of an inner mast 8 having a channeled cross section and adapted to roll along a flange section 8a of the inner mast 8 to support the thrust in the fore and aft direction of a material handling device, not shown. The outer side of the outer race 7 abuts a pressure-receiving section 8c in the web 8b of the inner mast 8. It is noted that this pressure-receiving section 8c is formed by a thickened rear side portion of the web 8b.

An adjustment screw 9 has a cross-shaped hole 9a at its one end and a hexagonal hole 9b at the other end, this cross-shaped hole 9a and the hexagonal hole 9b being used during assembling and adjustment, respectively. The one end 9A of the adjustment screw 9 is protruded out of the screw hole 3a of the roll pin 3. The projecting end is formed with a circular bulged portion 10 fitting with the inner peripheral portion of the boss 5A as later described. The other end 9B of the adjustment screw 9 is passed through a through-hole 2b formed in the rear plate 2 of the lift bracket 1. The adjustment screw 9 is locked at the adjusted position by a nut 14 threaded to the protruding end and constituting a locking means. The end of the roll pin 3 is formed with a counterboared portion 3b for avoiding conflict with the bulged portion 10. An annular groove 11 for engaging with the screw and a groove 12 for engaging with the boss are formed on the outer peripheral surface of the bulged portion 10 in the adjustment screw 9 and on the inner peripheral surface of the inner race 5 engaging therewith, respectively. That is, the adjustment screw 9 and the inner race 5 are unified to each other axially by the medium of a piston ring 13. The foremost part of the bulged portion 10 is tapered to facilitate the fitting of the piston ring 13. The bulged portion 10, grooves 11, 12 and the piston ring 13 constitute retaining means for allowing the inner race 5 and the adjustment screw 9 to be moved in unison.

In the above described arrangement of the lift roll supporting device according to the present invention, adjustment of the contact pressure of the outer lateral side of the outer race 7 relative to the pressure-receiving section 8c of the inner mast 8 is performed in such a manner that, with the lift roll 4 attached to the roll pin 3 being fitted in the recess 8A of the inner mast 8, the adjustment screw 9 is screwed by a hexagonal rod wrench, not shown, to thrust the inner race 5 axially outwardly, that is, towards the inner mast 8, by the intermediary of the piston ring 13. After adjustment, the nut 14 is tightened for locking the adjustment screw 9 in the thus adjusted position. Such adjustment by the adjustment screw 9 may be made easily even when the contact pressure is changed due to wear of the contact portions through usage.

When a partialized load acts during the material handling operation, as described hereinabove, such that flexure or distortion occurs between the inner mast 8 and the lift bracket 1 and, as a result, the inner mast 8 and the rear plate 2 are displaced in a direction away from each other, the lift roll 4 is prevented from dropping by virtue of the piston ring 13, while the trouble of the lift roll 4 being tilted and locking the roll pin 3 or the inner mast 8 may be prevented from occurring.

Although the above description has been made of the lift roll 4 for the lift bracket 1, the present invention may apply for the lift roll for the inner mast as well. The adjustment screw 9 may be engaged with the rear plate 2 instead of with the roll pin 3.

Figure 3:
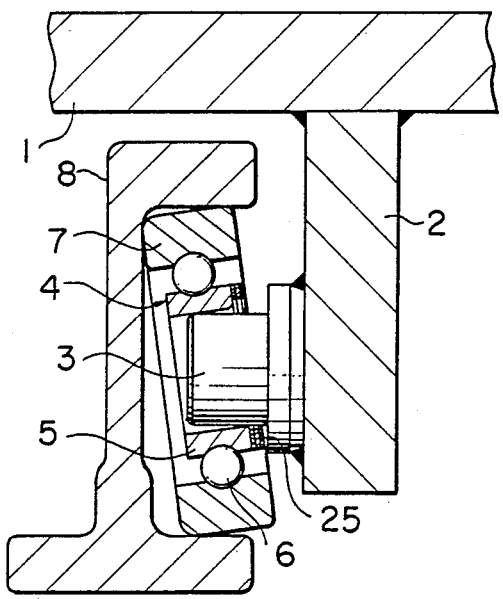
Figure 4:
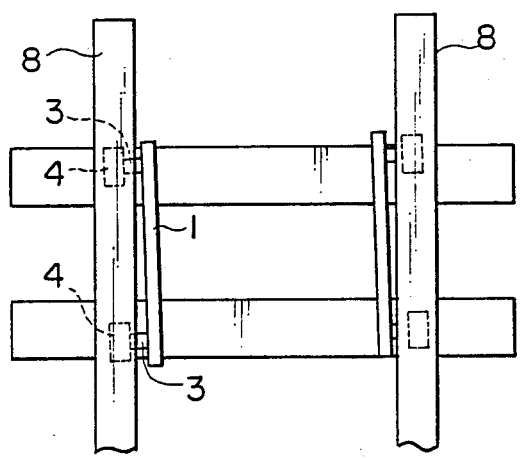
Figure 5:
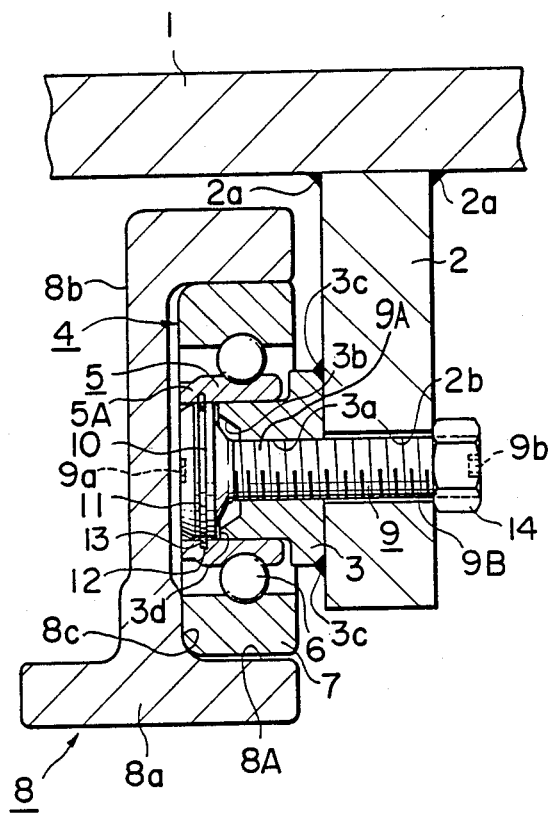
Figure 6:
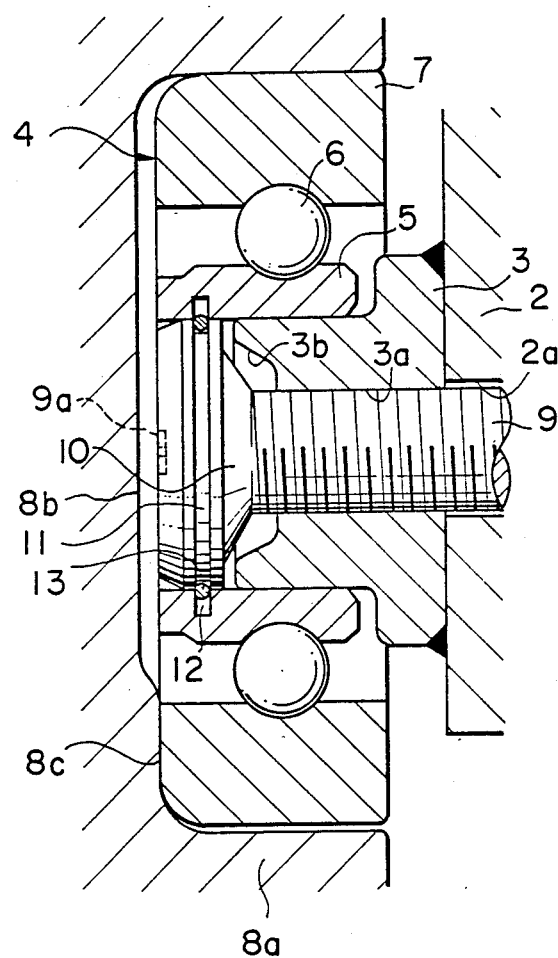
Figure 7:
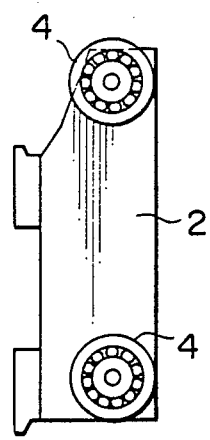
Figure 9:
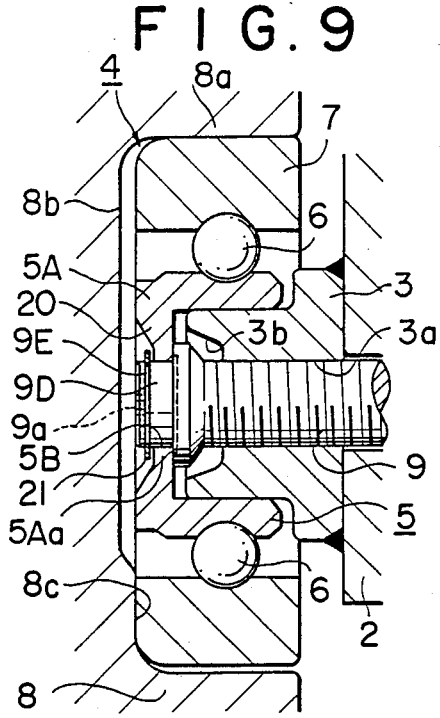

Referring to FIGS. 8 and 9, a second embodiment of the lift roll supporting device for a lift truck according to the present invention. In these figures, the parts or components that are the same as those shown in FIGS. 5 and 6 are depicted by the same numerals. In these figures, 1 denotes a lift bracket as a lift member. Roll pins 3 are secured by welds 3c to the upper and lower outer lateral sides of a rear plate 2 provided via welds 2a to this lift bracket 1. Each roll pin 3 has a central screw hole 3a. A lift roll 4 axially slidably fitted on the outer periphery of the pin 3. The lift roll is constituted by an annular outer race 7 fitted for rotation on the outer periphery of the inner race 5. The inner race 5 has on its one lateral side a boss 5A having an inwardly bulged flange 5Aa having a central circular through-hole 5B. The outer race 7, on the other hand, is fitted in the recess 8A of the channel-shaped inner mast 8, and is adapted to roll along a flange section 8a of the inner mast 8 to support the thrust in the fore and aft direction of a material handling device, not shown. The outer side of the outer race 7 abuts a pressure-receiving section 8c formed in the web 8b of the inner mast 8. It is noted that this pressure-receiving section 8c is formed by a thickened rear side portion of the web 8b.

An adjustment screw 9 has a cross-shaped hole 9a at its one end and a hexagonal hole 9b at its other end, this cross-shaped hole 9a and the hexagonal hole 9b being used during assembling and adjustment, respectively. The one end 9A of this adjustment screw 9 is protruded from the screw hole 3a of the roll 3 with the protruded end fitting in a central through-hole 5B in the flange section 5Aa of the inner race 5. An engaging flange 20 abutting on the inner surface of the flange section 5Aa of the inner race 5 is formed in the vicinity of the protruding portion from the screw opening 3a of the roll pin 3 of this adjustment screw 9, this engaging flange 20 receiving the lateral thrust acting on the inner race 5. The end of the roll pin 3 is formed with a counterbored portion 3b for avoiding possible conflict with the engaging flange 20. The protruding end of the adjustment screw 9 from the fitting shaft 9D formed in register with the flange section 5Aa is formed with an annular groove 9E. A snap ring 21 attached to this annular groove 9E abuts on the outer side of the flange section 5Aa of the inner race 5 to inhibit extraction of the lift roll 4 from the roll pin 3. On the other hand, the flange section 5Aa is sandwiched between the engaging flange 20 and the snap ring 21. The flange section 5Aa, engaging flange 20 and the snap ring 21 constitute retaining means whereby the inner race 5 and the adjustment screw 9 may be moved in unison. It is noted that the other end 9B of the adjustment screw 9 is passed through the through-hole 2b formed in the rear plate 2 of the lift bracket 1, and the adjustment screw 9 is locked in the adjusted position by a nut 14 threaded to the end portion and constituting the locking means.

In the above described arrangement of a second embodiment of the lift roll supporting device according to the present invention, adjustment of the contact pressure of the outer lateral sides of the outer race 7 relative to the pressure-receiving section 8c of the inner mast 8 is performed in such a manner that, with the lift roll 4 attached to the roll pin 3 being fitted in the inner mast 8, the adjustment screw 9 is screwed by a hexagonal rod wrench, not shown, to thrust the flange section 5Aa of the inner race 5 axially outwardly via the engaging flange 20. After adjustment, the nut 14 is tightened for locking the adjustment screw 9 in the pre-adjusted position. Such adjustment by the adjustment screw 9 may be made easily even when the contact pressure is changed due to wear of the contact portions even if a contact pressure is changed through usage.

When a partialized load acts during the material handling operation, as described hereinabove, such that flexure or distortion occurs between the inner mast 8 and the lift bracket 1 and the inner mast 8 and the rear plate 2 ar displaced in a direction away from each other, the lift roll 4 is prevented from dropping by the snap ring 21 while the trouble of the lift roll 4 being tilted and locking the roll pin 3 or the inner mast 8 may be prevented from occurring.

A third embodiment of the present invention will be explained by referring to FIG. 10. In this embodiment, a piston ring 30 is employed as the retaining means for the lift roll 4. The flange section 5Aa in the protruding portion 5A of the inner race 5 is thickened, as shown, and engaging grooves 41, 42 are formed in register with the inner peripheral surface of the through-hole 5B of this flange section 5Aa and the outer peripheral surface of a fitting shaft 9D of the adjustment screw 9 fitting on the inner peripheral surface. A piston ring 30 is fitted in the annular grooves 41, 42. The present embodiment is otherwise the same as the above described embodiments so that the same numerals are used to depict the same or corresponding parts. Hence, in this third embodiment, it is possible to adjust the contact pressure of the outer race 7 with respect to the pressure-receiving section 8c of the inner mast 8 by the adjustment screw 9, in the same way as in the preceding embodiments, while inhibiting the accidental extraction of the lift roll 4. Thus the engaging flange 20, flange section 5Aa and the piston ring 30 constitute retaining means whereby the inner race 5 and the adjustment screw 9 may be moved in unison.

Although the above description has been made of the lift roll 4 for the lift bracket 1, the present invention may apply for the lift roll for the inner mast as well. The adjustment screw 9 may be engaged with the rear plate 2 instead of with the roll pin 3.

What is claimed is:

1. A device for supporting a lift roll for a fork lift, comprising an annular inner race slidably fitted on a roll pin secured to a rear plate of a lift member, and an outer race rotatably fitted to said inner race, said outer race being adapted to roll along a flange section of an inner mast, with the lateral side of said outer race abutting on a web of said inner mast,
   wherein the improvement resides in that it further comprises,
   a protruding portion formed towards said inner mast of said inner race and protruding a predetermined length from an end of said roll pin,
   an adjustment screw passed through and threaded engaged with said rear plate and roll pin, and
   retaining means for engaging said adjustment screw with said protruding portion and for causing said inner race and said adjustment screw to be moved in unison,
   the contact pressure of said outer race at said pressure-receiving section being adjusted by rotation of said adjustment screw.

2. The device according to claim 1 wherein the other end of said adjustment screw protruding from said rear plate includes locking means for securing said adjustment screw at the pre-adjusted position.

3. The device according to claim 2 wherein said retaining means comprises a bulged portion formed at one end side section of adjustment screw passed through said roll pin, an engagement groove for a screw formed at said bulged portion, an engagement groove for a protruding portion formed at said protruding portion, and a piston ring disposed in said engagement groove for a screw and in said engagement groove for a protruding portion.

4. The device according to claim 2 wherein said retaining means comprises an inwardly flange projecting flange section formed in a protruding portion of said inner race and having a through-hole, a fitting shaft passed through said through-hole and formed at one end side of said adjustment screw, and an engaging flange and a snap ring provided at a position clamping said flange section at said one end side of said flange section.

5. The device according to claim 2 wherein said retaining means comprises a flange section formed in a protruding portion and having an engagement groove, a piston ring provided in said engagement groove, a fitting shaft passed through said through-hole and formed at one end side of said adjustment screw and an engaging flange provided at one end side of said adjustment screw and provided in abutment with said flange section.

6. The device according to claim 1 wherein said retaining means comprises a bulged portion formed at one end side section of adjustment screw passed through said roll pin, an engagement groove for a screw formed at said bulged portion, an engagement groove for a protruding portion formed at said protruding portion, and a piston ring disposed in said engagement groove for a screw and in said engagement groove for a protruding portion.

7. The device according to claim 1 wherein said retaining means comprises an inwardly projecting flange section formed in a protruding portion of said inner race and having a through-hole, a fitting shaft passed through said through-hole and formed at one end side of said adjustment screw, and an engaging flange and a snap ring provided at a position clamping said flange section at said one end side of said flange section.

8. The device according to claim 1 wherein said retaining means comprises a flange section formed in a protruding portion and having an engagement groove, a piston ring provided in said engagement groove, a fitting shaft passed through said through-hole and formed at one end side of said adjustment screw and an engaging flange provided at one end side of said adjustment screw and provided in abutment with said flange section.

* * * * *